(12) United States Patent
Coderre

(10) Patent No.: US 8,065,933 B2
(45) Date of Patent: Nov. 29, 2011

(54) ERGONOMIC BICYCLE PEDAL WITH REMOVABLE PLATFORM

(76) Inventor: Andre Coderre, Ste-Catherine-de-Hatley (CA)

( * ) Notice: Subject to any disclaimer, the term of this patent is extended or adjusted under 35 U.S.C. 154(b) by 347 days.

(21) Appl. No.: 11/995,537

(22) PCT Filed: Jul. 18, 2006

(86) PCT No.: PCT/CA2006/001206
§ 371 (c)(1),
(2), (4) Date: Jan. 13, 2008

(87) PCT Pub. No.: WO2007/009258
PCT Pub. Date: Jan. 25, 2007

(65) Prior Publication Data
US 2009/0158888 A1    Jun. 25, 2009

(51) Int. Cl.
*B62M 3/08* (2006.01)
(52) U.S. Cl. .................. 74/594.6; 74/594.4; 36/131
(58) Field of Classification Search ............... 74/594.4, 74/594.6, 594.7; 36/131
See application file for complete search history.

(56) References Cited

U.S. PATENT DOCUMENTS

| | | | | |
|---|---|---|---|---|
| 2,337,246 A * | 12/1943 | Kelly | ........................... | 74/594.7 |
| 4,033,199 A * | 7/1977 | Bouder | ........................ | 74/594.6 |
| 4,108,452 A * | 8/1978 | Baron | ........................ | 280/11.3 |
| 4,298,210 A * | 11/1981 | Lotteau et al. | ................ | 280/259 |
| 4,599,915 A * | 7/1986 | Hlavac et al. | ................ | 74/594.4 |
| 4,739,564 A * | 4/1988 | Eser | ................................. | 36/131 |
| 4,773,886 A * | 9/1988 | Teeter et al. | .................... | 441/70 |
| 4,819,504 A * | 4/1989 | Sampson | ..................... | 74/594.4 |
| 4,827,797 A * | 5/1989 | Le Faou et al. | .............. | 74/594.6 |
| 4,942,778 A * | 7/1990 | Bryne | ......................... | 74/594.6 |
| 5,251,508 A * | 10/1993 | Robbins | ...................... | 74/594.6 |
| 5,765,450 A * | 6/1998 | Kruger et al. | ................ | 74/594.6 |
| 5,901,617 A * | 5/1999 | Hervig | ......................... | 74/594.4 |
| 6,003,408 A * | 12/1999 | Hervig | ......................... | 74/594.4 |
| 7,174,807 B2 * | 2/2007 | Bryne | ......................... | 74/594.6 |

* cited by examiner

Primary Examiner — James Pilkington
Assistant Examiner — Thomas Diaz

(57) ABSTRACT

An ergonomic bicycle pedal with removable platform comprises a pedal axle configured to receive a pedal body A socket extends integrally from the underside of the removable platform. A front hook and a rear hook extend integrally from the underside of the platform with the front hook configured and sized to engage a front channel and a rear hook configured and sized to engage a rear channel. Both the front and the rear channels are configured to allow rotational movement along two axes by having the socket moving on top of the ball and having the front hook moving within the front channel and the rear hook moving within the rear channel.

13 Claims, 11 Drawing Sheets

ERGONOMIC BICYCLE PEDAL WITH REMOVABLE PLATFORM

This application claims priority based on PCT application PCT/CA2006/001206 filed Jul. 18, 2006

BACKGROUND OF THE INVENTION

1. Field of the Invention

The invention relates generally to a pedaling system for bicycles but more particularly to a system having a removable platform that can be fitted on a shoe.

2. Background of the Invention

It is well known in competitive cycling to have part of the pedal attached to the footwear of the cyclist and having a specially configured footwear clip to the rest of the pedaling system of a bicycle.

The drawback of such an approach has to do with safety. Indeed, the foot is either tied to the pedal, as found in earlier system and in which case it can be the cause of serious injury when a cyclist falls, or the foot is clipped onto the pedal, which allows for the release of the foot in case of a fall, but that approach is not foolproof. Moreover, the clip does not allow for much in the freedom of movement of the foot and can create alignment problems with various parts of the leg which can cause strain injuries over time.

Moreover, these approaches require a special shoe configured to be attached to the pedal which makes these shoes very uncomfortable especially when cyclist disembarks from his bicycle and wants to walk about.

Clearly, there is a need for a safer and more comfortable type of bicycle pedaling system.

SUMMARY OF THE INVENTION

In view of the foregoing disadvantages inherent in the known devices now present in the prior art, the present invention, which will be described subsequently in greater detail, is to provide objects and advantages which are:

A first advantage of this invention to provide for a pedaling system that can be used with a wide variety of general purpose shoes as well as a custom shoe if so desired.

It is a second advantage of this invention to provide for a pedaling system that is safe since it offers a passive release mechanism.

It is a third advantage of this invention to provide for a floating movement of the foot on two axis so as to compensate for a user's particular foot and leg alignment.

It is a fourth advantage of this invention to provide for a pedal with a large range of lateral displacement.

In order to do so, the invention comprises a pedal axle configured to receive a pedal body rotationally attached to the axle sleeve. The pedal body is further comprised of at least one face to be functional but generally two identical halves forming one of two faces mating around the axle sleeve so as to create the pedal body when retained by mechanical fasteners. Each of the faces has a rotational axis part known as a ball on top of which rotates a socket. The socket extends integrally from the underside of a removable platform which has a topside and the underside. The reason for the two faces is for practical reasons since the user does not need to turn the pedal around to show the face when the pedal has two faces. Other ways to get around that are already known in the art such as using a counterweight or having the pedal off axis so that it always drops with the right side showing.

A front hook and a rear hook extend integrally from the underside of the removable platform with the front hook configured and sized to engage a front channel and a rear hook configured and sized to engage a rear channel. Both the front and the rear channels are configured to allow rotational movement along two axes by having the socket moving on top of the ball and having the front hook moving within the front channel and the rear hook moving within the rear channel.

The ergonomic bicycle pedal is used in the following manner: A user having the removable platform already attached to his shoe or foot inserts the rear hook into the rear channel and then follows by inserting the front hook into the front channel, the user is then ready to start pedaling. And, in order to remove the removable platform from the pedal body, the user lifts the front of his foot to have the front hook disengage from the front channel followed by a slight forward motion of the foot to disengage the rear hook from the rear channel. This series of motion can be learned quite easily as it is very close to natural foot motion and as a result, an accidental fall allows the user to quickly disengage his feet so as to prevent a full fall or at least be freed from the bicycle pedals so as to minimize injury.

Other features include the axle sleeve having tracks to train the pedal body along with the axle sleeve, so that the pedal body does not rotate around the axle sleeve but follows it instead.

Also, markings on the axle sleeve are used for calibrating lateral displacement of the pedal body towards or away from the bicycle so as to contribute to a better alignment of the leg with the pedal and the body of the user.

In one embodiment of the removable platform, notches are for use by optional accessories.

In another embodiment, the removable platform can have holes passing from the underside to the topside, again for use by optional accessories.

In yet another embodiment, the removable platform has grooves.

Any combination of grooves, holes and notches can be had on the removable platform so as to increase its versatility such as by allowing hooks to be attached to the platform and which are used to hook a shoe for example.

The removable platform is allowed rotational motion along two axes which provides proper alignment between ankle, knee, and hip.

The pedal system can even be used without the removable platform installed but of course, this reduces most of its ergonomic advantages as well as making it less optimal in its operation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DETAILED DESCRIPTION OF THE PREFERRED EMBODIMENT

Figure 1:
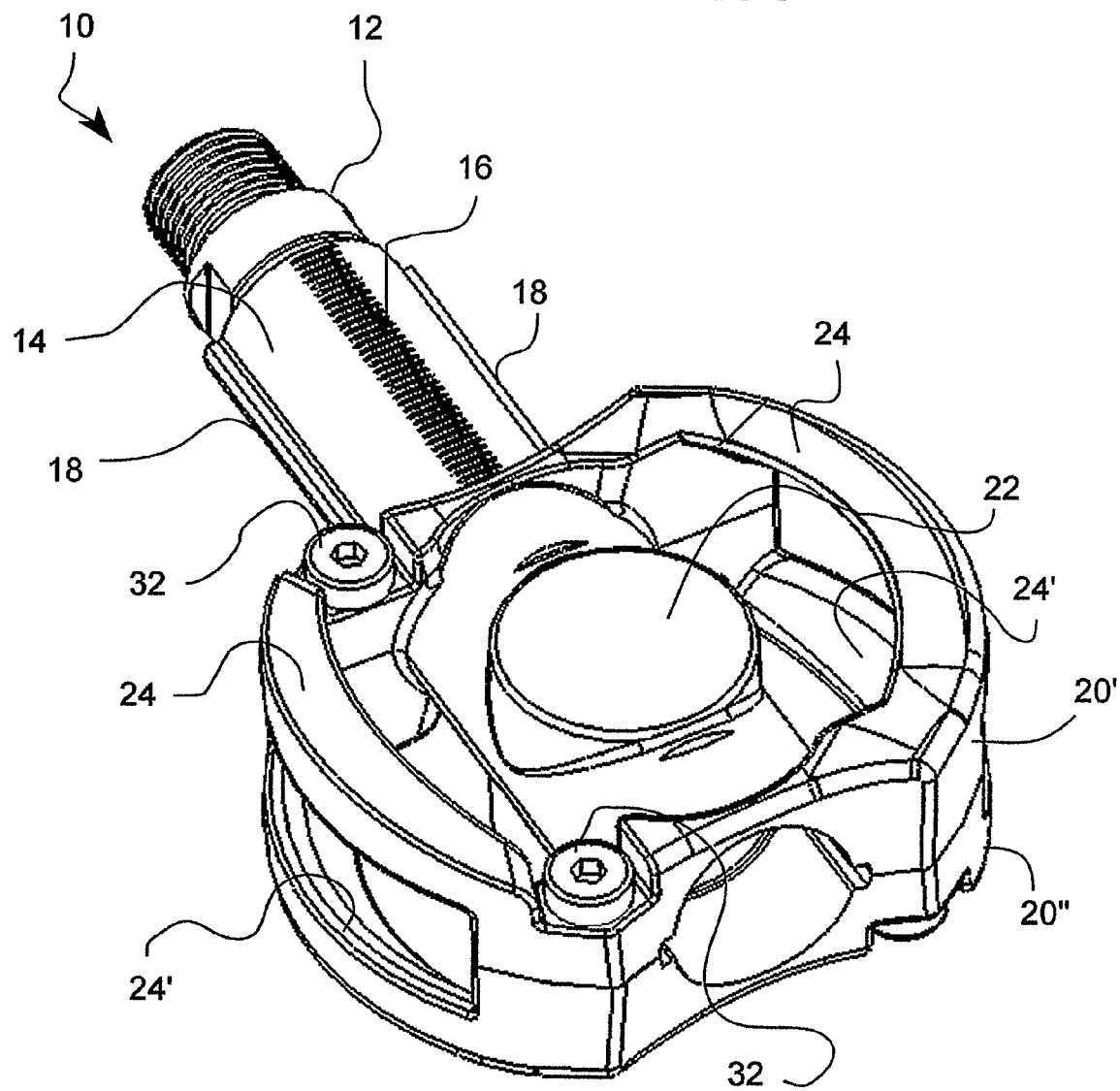
FIG. 1 Perspective view of the bicycle pedal.
Figure 2:
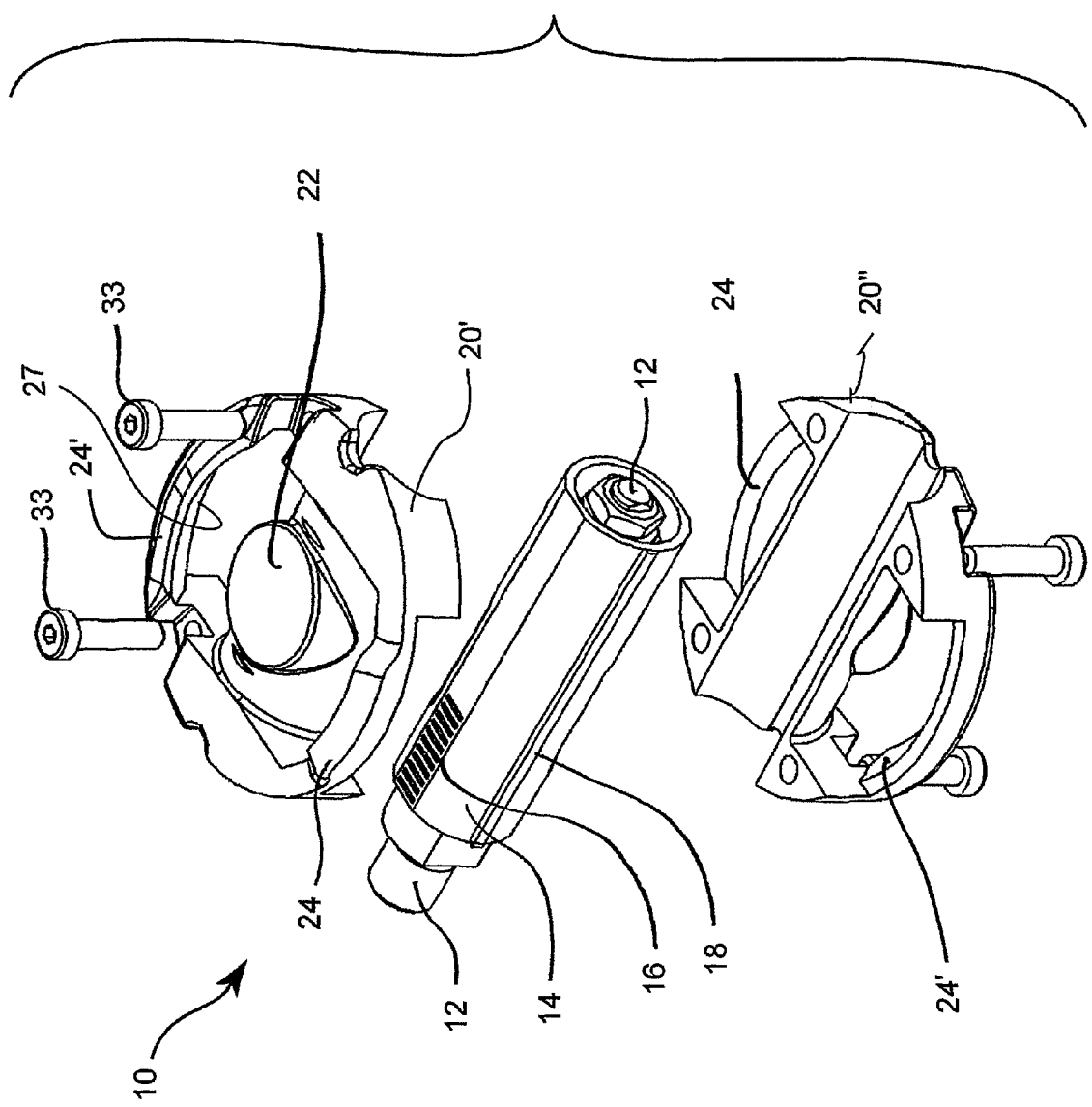
FIG. 2 Exploded view of FIG. 1.
Figure 3:
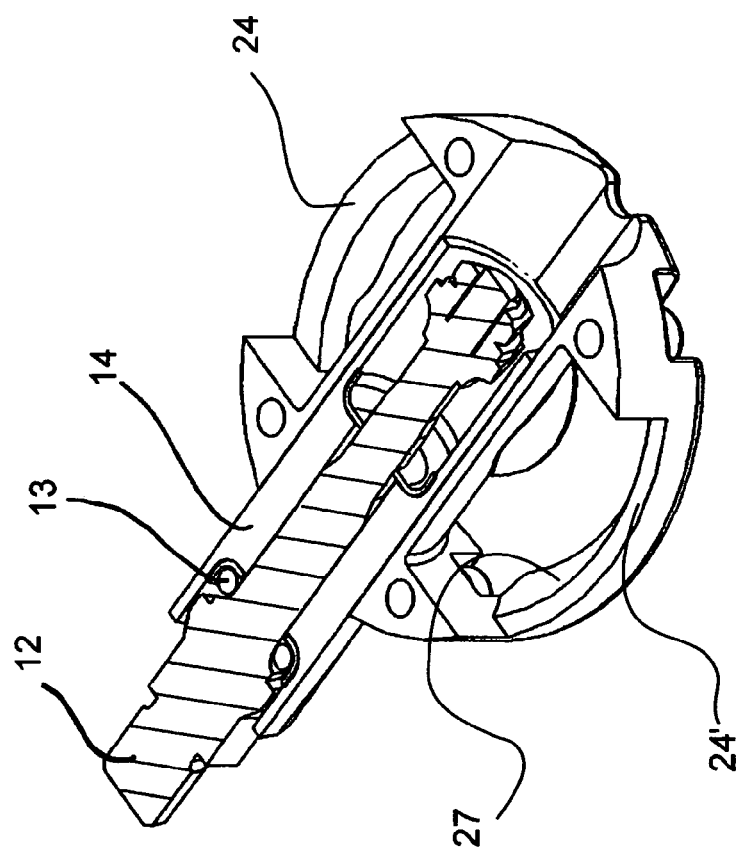
FIG. 3 Crosscut along line 3-3 of FIG. 11.

An ergonomic bicycle pedal with removable platform (10) begins with a pedal axle (12) with ball bearings (13) similar to those known in the art but preferably modified to receive an axle sleeve (14) wrapping around it. Although not absolutely essential, the axle sleeve (14) optimizes the functionality. On that axle sleeve (14) are tracks (18) to guide a pedal body (20), so that it does not rotate around the axle sleeve (14). Said axle sleeve also includes markings (16) for carefully calibrating that lateral displacement of the pedal body (20).

Figure 4:
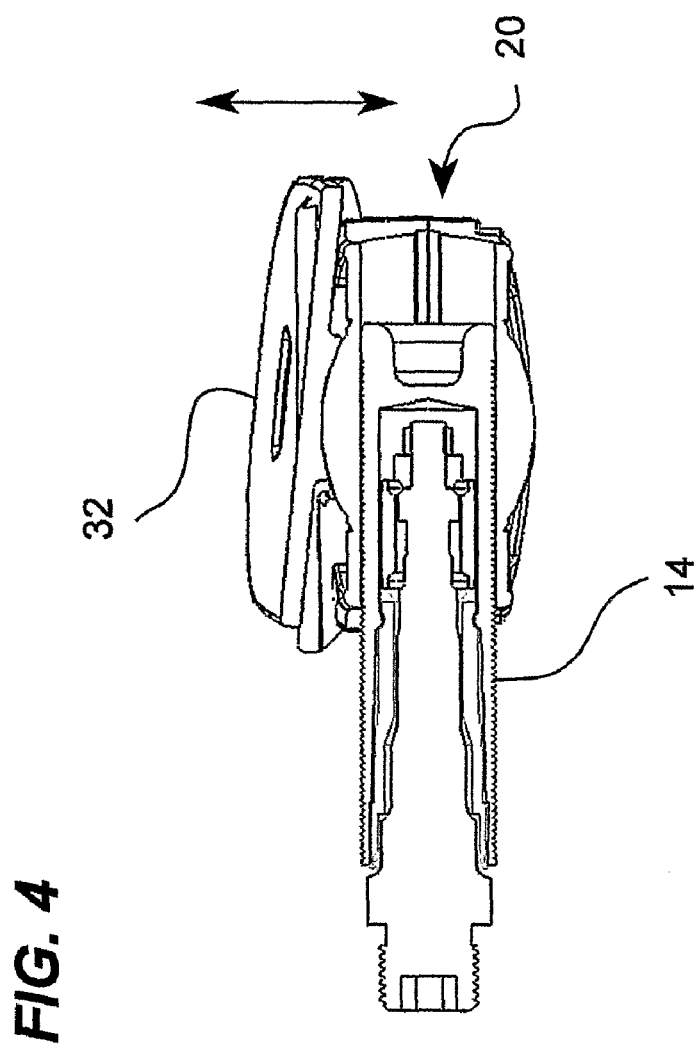
FIG. 4 Side cross sectional view of the removable platform showing angular displacement along Y axis.
Figure 5:
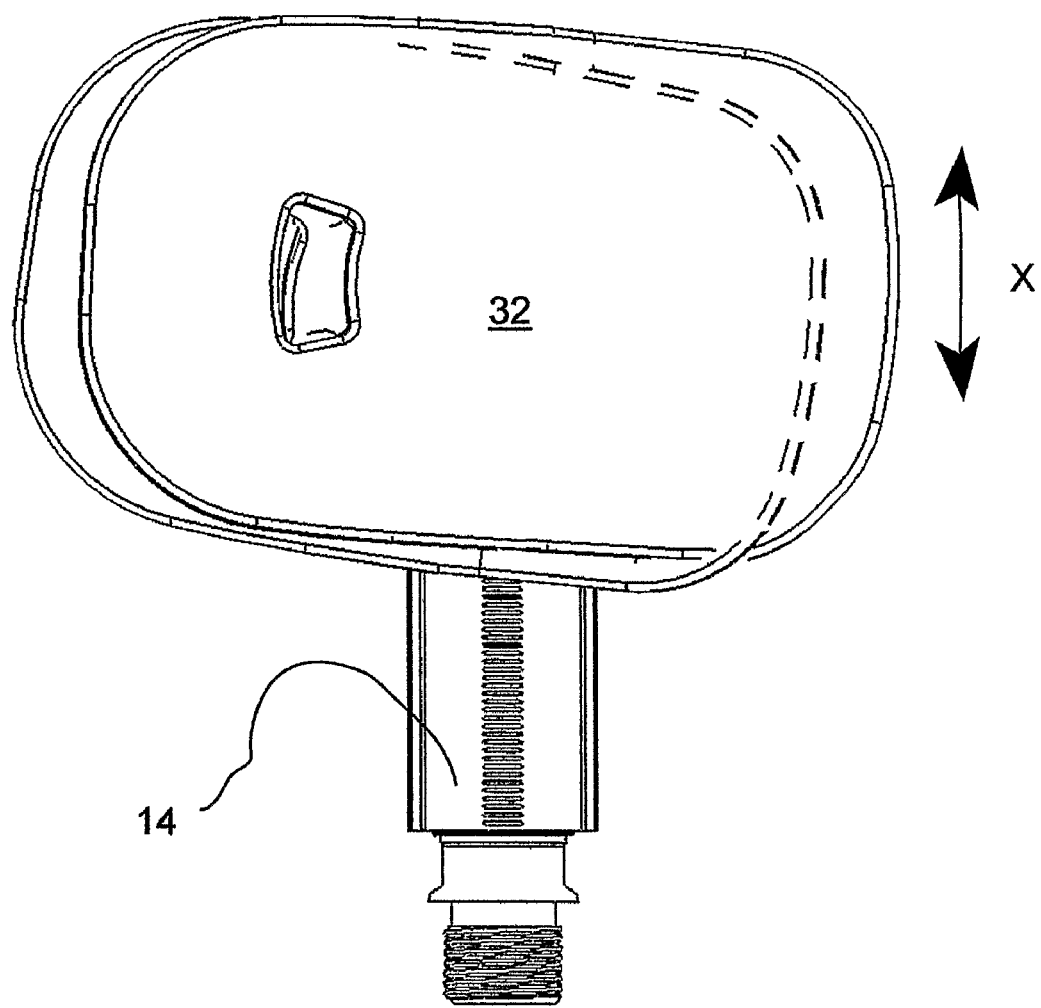
FIG. 5 Top view of the removable platform showing angular displacement along X axis.

The pedal body (20) is essentially comprised of at least one but preferably two identical halves forming one of two faces (20', 20") clasping the axle sleeve (14) so as to form the pedal body (20) when retained by mechanical fasteners (33). Each face (20', 20") has a rotational axis part known as a ball (22) on top of which rotates a socket (23) which extends integrally from the underside of the removable platform (32). As seen in FIG. 4 the removable platform (32) is allowed angular movement that angles a shoe (or foot) (21) from side to side along a vertical <<Y>> axis, as seen from the front. FIG. 5, shows an angular movement, from a horizontal plane running parallel to the length of the shoe or foot (21) as seen from the top, along the <<X>> axis.

These angular movements are possible because front hook (25) engages front channel (24) and rear hook (25') engages rear channel (24'), and socket (23) rests on top of ball (22). Different shapes could be given to the ball (22) and socket (23) such as complementary conical shapes or the ball (22) and sockets (23) could switch place since the convex/concave shapes are permutable. In more practical use, a convex shape is preferred on the pedal body (20) because dirt or mud is less likely to settle in than if it were concave. Also, both the front and rear channels (24, 24') are part of an imaginary sphere of which their arcuate shape is but a part of and that virtual sphere shares the same center as the center of the smaller virtual sphere of which the ball (22) is but a small representation. That is why any movement of the socket (23) on the ball (22) is followed by movement of the front and rear hooks (25, 25') inside the curved front and rear channels (24, 24').

Figure 9A:
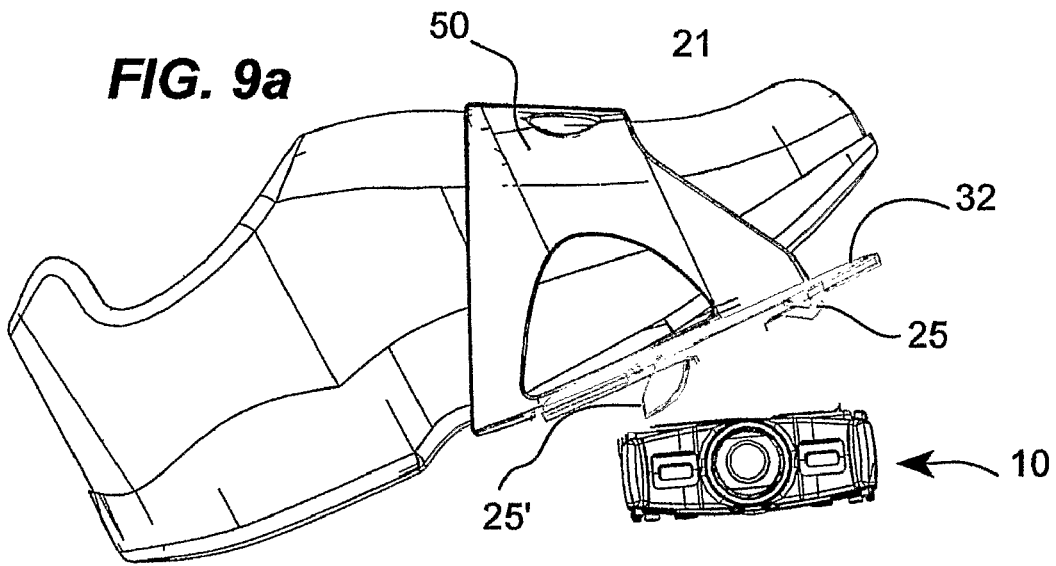
FIGS. 9a-9c Showing the insertion of the removable platform into the pedal body.
Figure 9B:
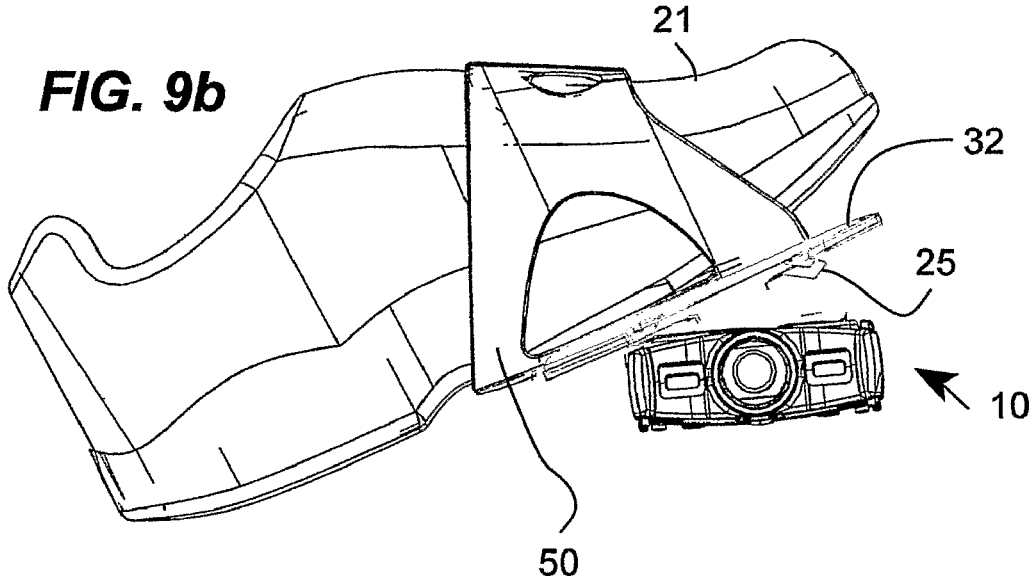
Figure 9C:
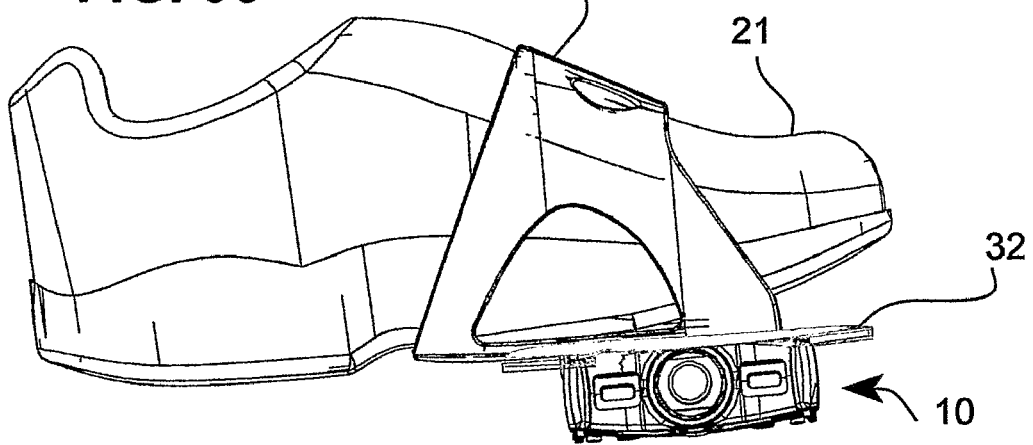

In a preferred embodiment, the removable platform (32) is removable since the front hook (25) barely makes frictional contact with the front channel (24) and the rear hook (25'), although having a nosing (29) which engages a wedge (27) built into the rear channel (24'), still allows for easy removal of the removable platform (32). The front channel (24) also has a wedge (27), not visible in the figures, but similar to that of the rear channel (24') so as the create the friction necessary to engage the platform (32) onto the pedal body (20). In order to put one's foot (21) onto the pedal with removable platform (10), as seen in FIGS. 9a-c, a user having the removable platform (32) already attached to his foot (50) will insert the rear hook (25') into the rear channel (24') with a slight rearward motion followed by inserting the front hook (25) into the front channel (24). In order to remove the removable platform (32), the user lifts the front of the shoe (21) to have the front hook (25) disengage from the front channel (24) and followed by a slight forward motion of the shoe (21) to disengage the rear hook (25') from the rear channel (24'). The simultaneous movement along the two axes as well as the lateral displacement of the pedal body (20) allows for precise customization to the needs of the user.

Figure 10:
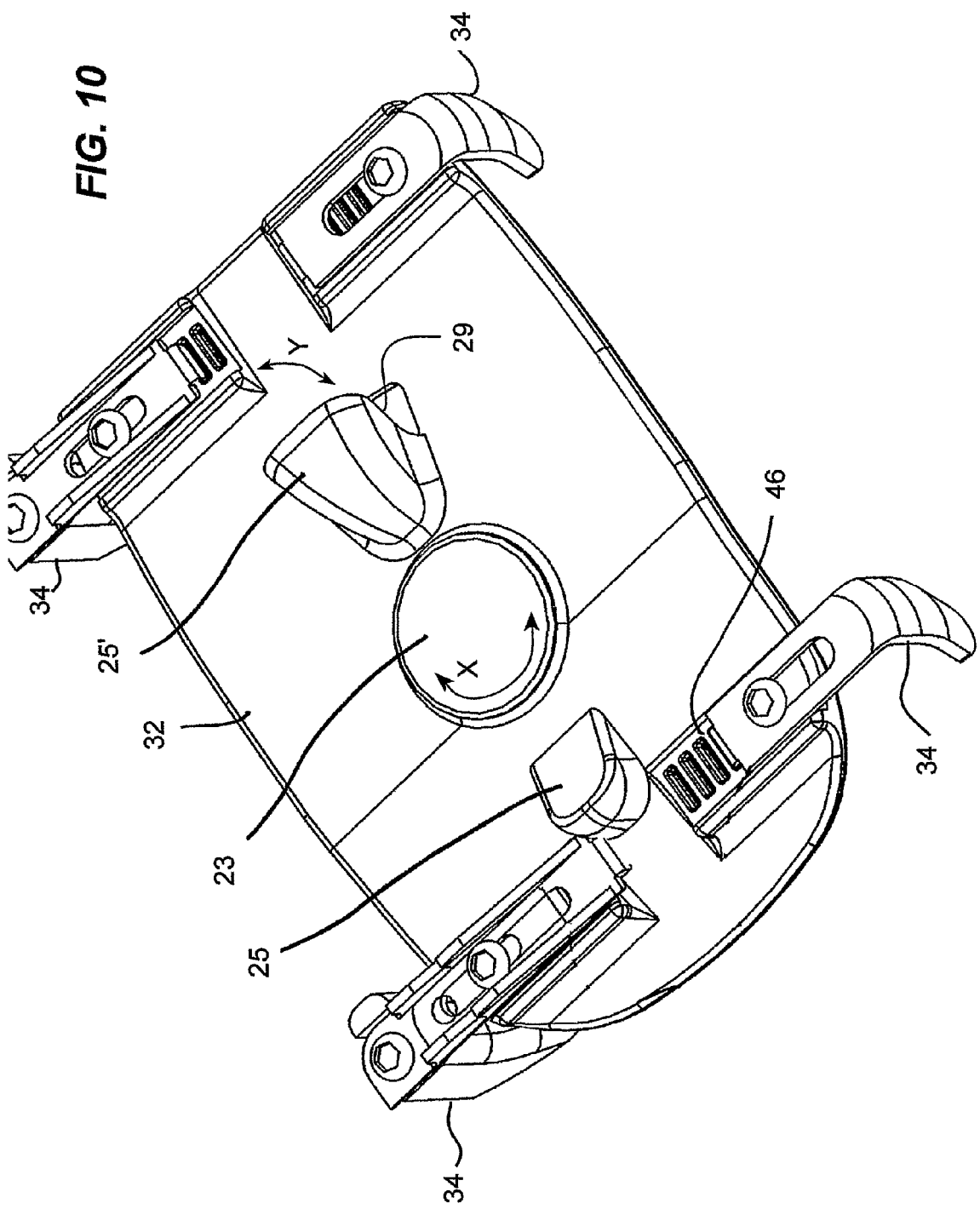
FIG. 10 Isometric view favoring the underside of the removable platform.
Figure 11:
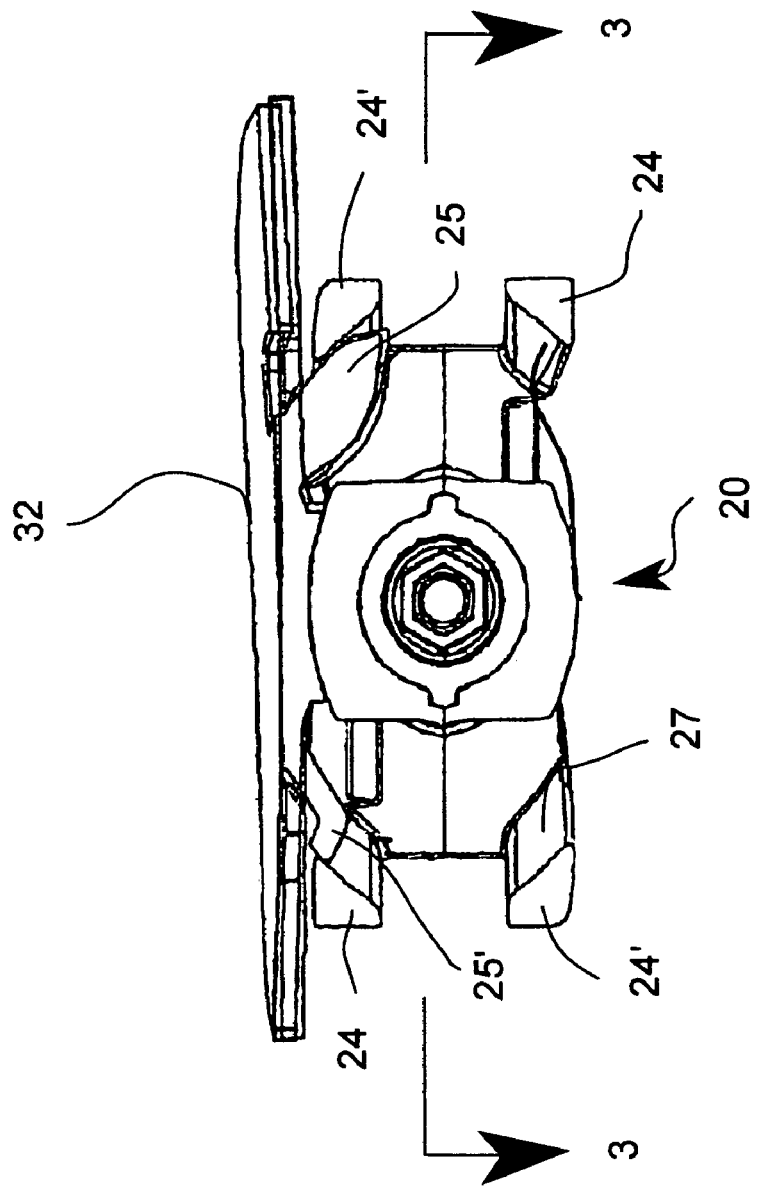
FIG. 11 Cutaway view showing the front and rear hooks.

The removable platform (32) comes in various configurations. FIG. 5 shows a version of the removable platform (32) that is plain on its topside, while FIG. 10 shows a version of the removable platform (32) that has notches (46) so as to fit a variety of optional accessories such as hooks (34) for example. In the example illustrated, the notches (46) are on the underside but the reader skilled would realize that the notches (46) can also be located on the topside or even on the edge of the platform (32).

Figure 6:
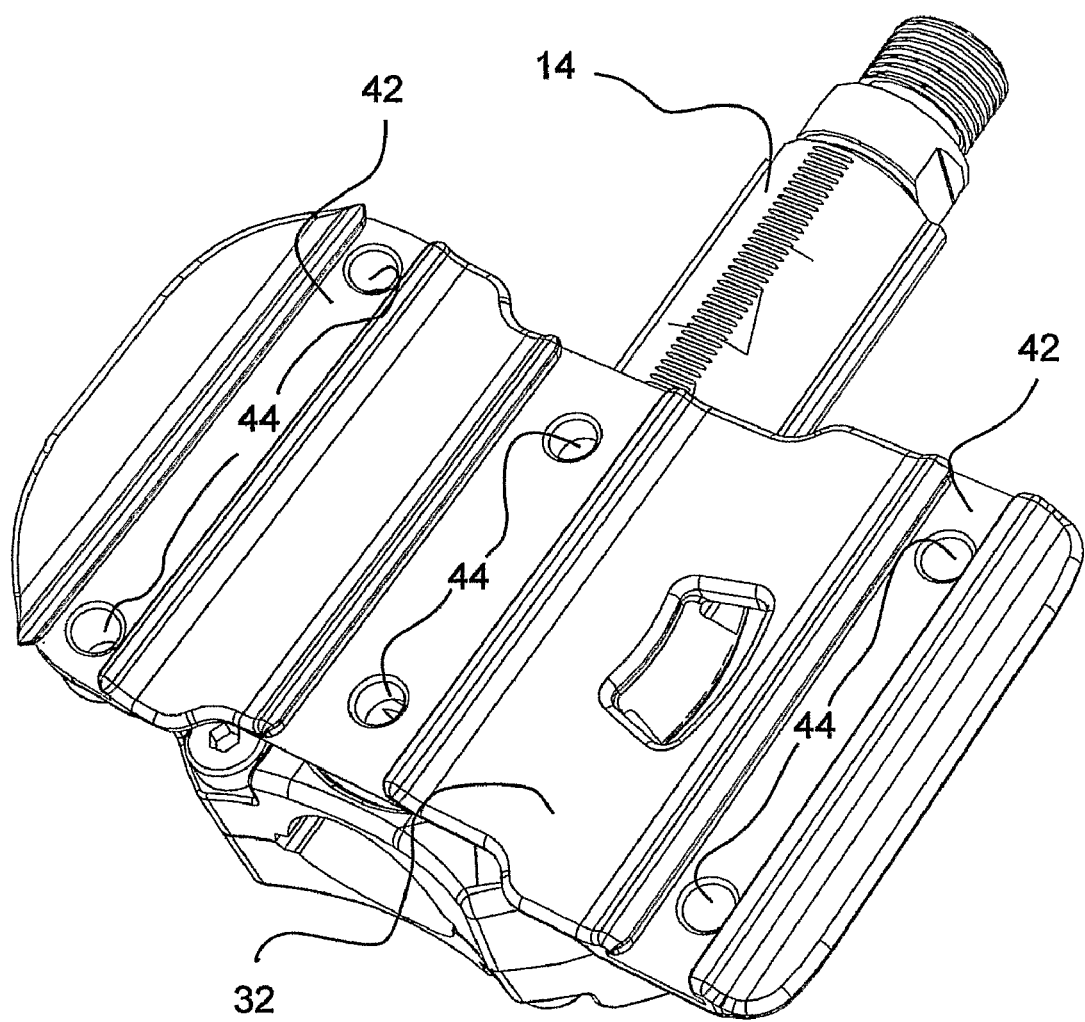
FIG. 6 Isometric view favoring the top of the removable platform with channels.
Figure 7:
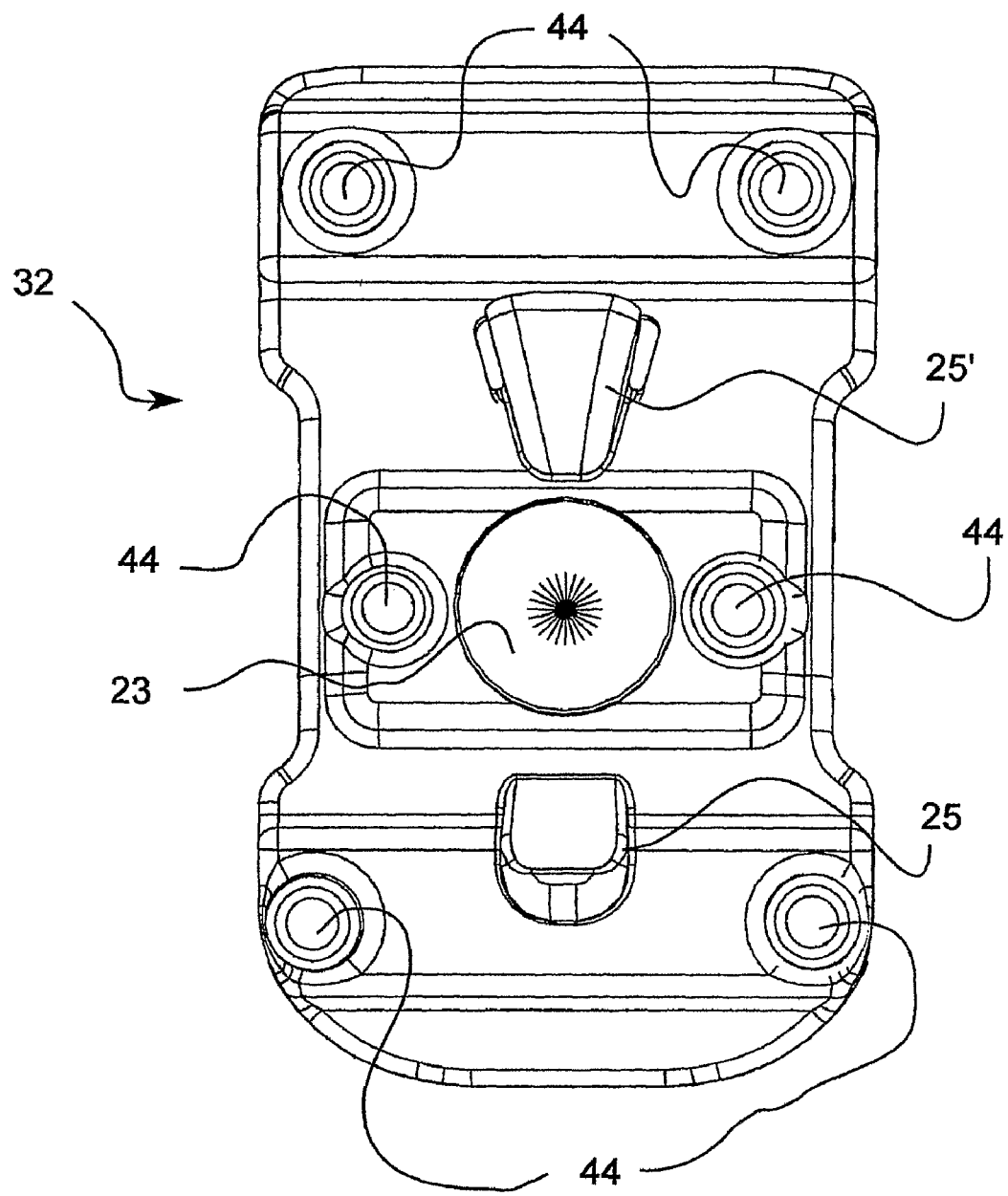
FIG. 7 Bottom view of the removable platform.
Figure 8:
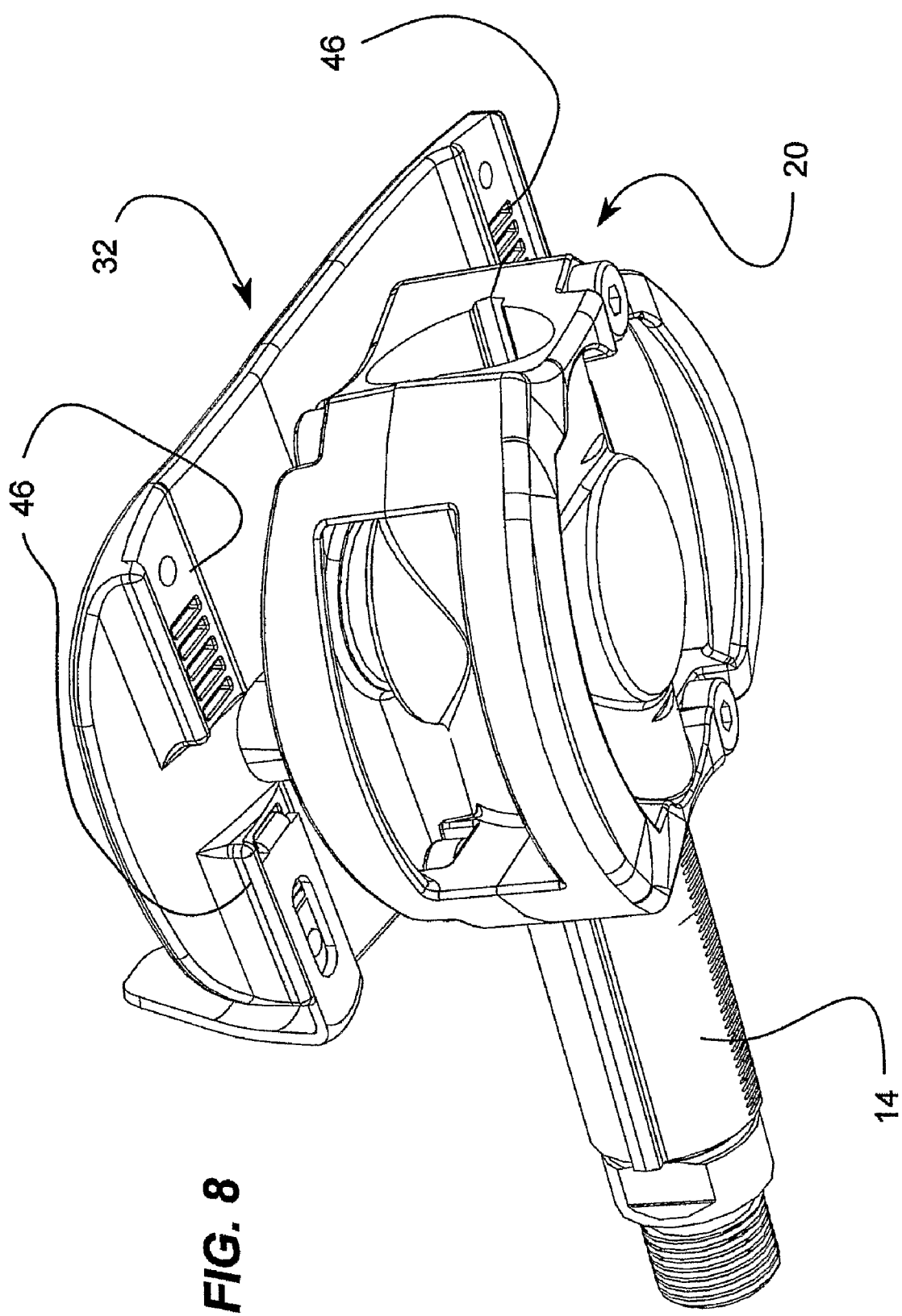
FIG. 8 Isometric view of the bicycle pedal with removable platform favoring the underside.

FIG. 7 shows the underside of yet another variation of the removable platform (32) having holes (44) which can be used to attach accessories such as, for example a strap (50) or a shoe (21) by way of mechanical fasteners (not shown). Indeed a shoe (21) can be attached to the removable platform (32) so as to make the shoe (21) a dedicated biking shoe as is already done in the art. There are indeed a variety of custom shoes that could be made to fit this removable platform (32) as is already known in other related prior art where a user inserts his shoe by giving it a quarter turn so as to engage it into a pedal. In this case, the shoe (21) would be given a quarter turn to lock into an interface (not shown) itself attached to the removable platform (32) using either the notches (46) or grooves (42) as seen in FIG. 6, again, as is the cases with the notches (42), the grooves (42) can be on any sides of the platform (32). The reader skilled in the art will appreciate that with provisions for notches (46) and/or grooves (42), the removable platform (32) can receive a multitude of accessories that allow for different ways of securing any type of footwear, even bare feet onto the removable platform (32).

Ultimately, the bicycle pedal (10) can be used with or without the removable platform (32) but of course, none of the ergonomic and performance of the pedal (10) would be achieved, it would be just like an ordinary pedal, which is okay for short runs to the grocery store when one does not want to strap on the removable platform (32) or choose an accessory to put on the removable platform.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

The invention claimed is:

1. An ergonomic bicycle pedal with removable platform comprising:
    a pedal axle, a pedal body configured to mate with said pedal axle and rotationally attached to said pedal axle;
    a platform removably attachable to said pedal body;
    said pedal body comprising on at least one face having a rotational axis part;
    said removable platform having a topside and an underside facing the face of said pedal body comprising said rotational axis part;
    said removable platform comprising on its underside a socket;
    said rotational axis part and said socket having complementary shapes to work in conjunction and to allow rotational movement of said socket on said rotational axis part;
    a front channel and a rear channel both located on said face of said pedal body comprising said rotational axis part;
    a front hook and a rear hook extending integrally from said underside of said removable platform;
    said front hook configured and sized to engage said front channel and to move within said front channel;
    said rear hook configured and sized to engage said rear channel and to move within said rear channel;
    said front channel and
    said rear channel being configured to allow rotational movement of said removable platform relative to said pedal body around two axes:
    an axle sleeve having markings along a longitudinal axis thereof for calibrating a lateral position of said sleeve with respect to said pedal body.

2. An ergonomic bicycle pedal with removable platform as in claim 1 wherein:
    said axle sleeve journaled around said pedal axle is rotationally attached to said pedal axle and said pedal body being fixedly attached to said axle sleeve.

3. An ergonomic bicycle pedal with removable platform as in claim 1 having the following method of use:
    in order to install said removable platform onto said pedal body, a user having said removable platform already attached to his foot inserts said rear hook into said rear channel;
    then follows by inserting said front hook into said front channel;
    in order to remove said removable platform from said pedal body, said user lifts said front of said foot to have said front hook disengage from said front channel; and
    followed by a slight forward motion of said foot to disengage said rear hook from said rear channel.

4. An ergonomic bicycle pedal with removable platform as in claim 1 wherein:
    said axle sleeve having tracks to guide said pedal body, so that said pedal body does not rotate around said axle sleeve.

5. An ergonomic bicycle pedal with removable platform as in claim 1 wherein:
    said removable platform has notches forming an integral part thereof, so as to fit a variety of optional accessories onto said removable platform.

6. An ergonomic bicycle pedal with removable platform as in claim 1 wherein:
    said removable platform having holes that pass from the underside to the topside of said removable platform so as to fit a variety of optional accessories onto said removable platform.

7. An ergonomic bicycle pedal with removable platform as in claim 1 wherein:
    said removable platform has grooves forming an integral part thereof, so as to fit a variety of optional accessories onto said removable platform.

8. An ergonomic bicycle pedal with removable platform as in claim 1 wherein:
    said removable platform has both notches, forming an integral part thereof, and holes passing from said underside to said topside so as to fit a variety of optional accessories onto said removable platform.

9. An ergonomic bicycle pedal with removable platform as in claim 1 wherein:
    said removable platform has both notches and grooves, forming integral parts thereof, so as to fit a variety of optional accessories onto said removable platform.

10. An ergonomic bicycle pedal with removable platform as in claim 1 wherein:
    said removable platform has both grooves, forming an integral part thereof, and holes passing from said underside to said topside so as to fit a variety of optional accessories onto said removable platform.

11. An ergonomic bicycle pedal with removable platform as in claim 1 wherein:
    said removable platform has notches forming an integral part thereof, so as to fit a variety of optional accessories onto said removable platform;
    said removable platform having holes that pass from the underside to the topside of said removable platform so as to fit said variety of optional accessories onto said removable platform;
    said removable platform has grooves forming an integral part thereof, so as to fit said variety of optional accessories onto said removable platform.

12. An ergonomic bicycle pedal with removable platform as in claim 1 wherein:
    there are two said faces.

13. An ergonomic bicycle pedal with removable platform comprising:
    a pedal axle;
    a pedal body configured to mate with said pedal axle and rotationally attached to it;
    a platform removably attachable to said pedal body;
    said removable platform having a topside and an underside facing a face of said pedal body;

said removable platform comprising on its underside a rotational axis part said pedal body comprising on at least its face facing said removable platform a socket;

said rotational axis part and said socket having complementary shapes to work in conjunction and to allow rotational movement of said rotational axis part on said socket;

a front channel and a rear channel both located on said face of said pedal body comprising said socket;

a front hook and a rear hook extending integrally from said underside of said removable platform;

said front hook configured and sized to engage said front channel and to move within said front channel;

said rear hook configured and sized to engage said rear channel and to move within said rear channel;

said front and rear channels and said front and rear hooks being configured to allow rotational movement of said removable platform relative to said pedal body along two axes by having said rotational axis part socket moving on said socket;

said rotational axis part and said socket are permutable convex or concave.

\* \* \* \* \*